United States Patent [19]

Aviram et al.

[11] 3,767,289
[45] Oct. 23, 1973

[54] CLASS OF STABLE TRANS-STILBENE COMPOUNDS, SOME DISPLAYING NEMATIC MESOPHASES AT OR NEAR ROOM TEMPERATURE AND OTHERS IN A RANGE UP TO 100° C

[75] Inventors: Arieh Aviram, Ossining, N.Y.; Robert J. Cox, Los Gatos, Calif.; William R. Young, Mount Kisco, N.Y.

[73] Assignee: International Business Machines Corporation, Armonk, N.Y.

[22] Filed: Dec. 31, 1970

[21] Appl. No.: 103,340

[52] U.S. Cl. .............................. 350/160 R, 252/408
[51] Int. Cl. ............................................. G02f 1/20
[58] Field of Search...................... 350/160; 252/408

[56] References Cited
UNITED STATES PATENTS
3,322,485   5/1967   Williams ............................ 350/160
FOREIGN PATENTS OR APPLICATIONS
1,170,486   11/1969  Great Britain ..................... 252/408

OTHER PUBLICATIONS

Russian Chemical Reviews (—) Chemical Characteristics, Structure and Properties of Liquid Crystal by Usol'Tseva et al., pp. 495–507, Vol. 32, No. 9.

Primary Examiner—Charles E. Van Horn
Assistant Examiner—M. B. Wittenberg
Attorney—Abraham A. Saffitz

[57]         ABSTRACT

A new class of stable trans-stilbene compounds, some displaying nematic mesophases at or near room temperature and others in a range up to 100°C., are useful in liquid crystal display devices. Exemplary compounds are 4-butoxy, 4'-n-butyl-β-chloro trans-stilbene, having a nematic range of 30°–52°C., 4-ethoxy, 4'-n-butyl-β-chloro trans-stilbene, having a nematic range of 29°–58°C., and 4-ethoxy, 4°-methylbutyl)-β-chloro trans-stilbene, having a nematic range of 29°–34°C.; a mixture containing 60 mole-% 4-ethoxy, 4'-n-butyl-β-chloro trans-stilbene and 40 mole-% 4-ethoxy-4'-n-octyl-β-chloro trans-stilbene has a nematic range of 8°–59°C.

16 Claims, No Drawings

CLASS OF STABLE TRANS-STILBENE COMPOUNDS, SOME DISPLAYING NEMATIC MESOPHASES AT OR NEAR ROOM TEMPERATURE AND OTHERS IN A RANGE UP TO 100° C

BRIEF SUMMARY OF THE INVENTION

This invention relates to a new class of stable trans-stilbene compounds which exhibit mesomorphism and some of which display nematic mesophases at or near room temperature, while others exhibit nematic phases in a range up to 100°C., as well as to liquid crystal display devices using members of this new class.

This invention further relates to the preparation of the novel trans-stilbene compounds which exhibit unusual long-term stability and desirable nematic properties at or near room temperature and in temperature ranges up to 100°C.

This invention also relates to the use of said unique compounds per se and in admixture with each other in liquid crystal display devices which are operable at or near room temperature and at temperatures up to 100°C.

Structural Formula of Trans-Stilbene Compounds

The trans-stilbene compounds of the invention have the following formula

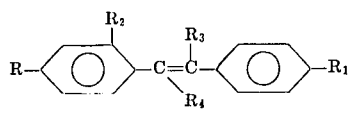

I wherein R and $R_1$ are radicals which foster mesomorphism and each is selected from the group consisting of alkyl, alkanoyloxy, nitrile, and alkoxy groups, and wherein $R_2$, $R_3$ and $R_4$ are $-CH_3$, $-Cl$ or $-H$, at least one of these groups $R_2$, $R_3$ and $R_4$ being different from H and mixtures of said compounds.

Preparation of Compounds of Formula I

For purposes of synthesis, the trans-stilbene compounds of the invention may be sub-divided into the following groups:

1. 4-alkoxy, 4'-alkyl-α-chloro trans-stilbenes
2. 4-alkoxy, 4'-alkyl-β-chloro trans-stilbenes
3. 4-alkoxy, 4'-alkyl-α-methyl trans-stilbenes
4. 4-alkoxy, 4'-alkyl-β-methyl trans-stilbenes
5. 4-alkyl, 4'-alkyl-β-chloro trans-stilbenes
6. 4-alkoxy, 2-methyl, 4'-alkyl trans-stilbenes
7. 4-alkanoyloxy, 4'-alkyl-β-chloro trans-stilbenes
8. 4-alkoxy, 4'-alkoxy-β-chloro trans-stilbenes
9. 4-alkoxy, 4'-alkoxy-β-methyl trans-stilbenes
10. 4-alkoxy, 4'-alkoxy-α-methyl trans-stilbenes
11. 4-cyano, 4'-alkyl-β-chloro trans-stilbenes The close synthetic as well as structural relationship of Groups 1, 2, 5, 7, 8, 11, and 3, 4, 9 and 10 are obvious.

Synthesis of α-Chloro and β-Chloro Trans-Stilbenes (Groups 1, 2, 5, 7, 8 and 11 above)

Generally, the synthesis of the α and β-chloro trans-stilbenes of Groups 1, 2, 5, 7, 8 and 11 above is carried out by the condensation of the appropriate benzyl phenyl ketone with phosphorous pentachloride in methylene chloride solvent followed by silica gel treatment and recrystallization from petroleum ether or alcohol.

Synthesis of α-Methyl and β-Methyl Trans-Stilbenes (Groups 3, 4, 9 and 10 above)

The synthesis of the α-methyl and β-methyl trans-stilbenes is by reaction of methyl magnesium halide (Grignard reagent) with the appropriate benzyl phenyl ketone in inert solvent, such as ether, followed by a work-up in a sublimator with sodium bisulfate to permit dehydration and evolution of vapor. The product is crystallized from petroleum ether at −78°C. to a highest melting point.

Synthesis of Ortho-Substituted Trans-Stilbenes (Group 6 above)

The trans-stilbenes with ortho-substituents on the benzene ring are prepared by condensing appropriate benzyl phenyl ketone with lithium aluminum hydride under nitrogen sparge followed by dehydration.

BACKGROUND OF THE INVENTION

Nematic liquid crystal light valves and display devices based on nematic thermotropic compounds are described in U. S. Pat. No. 3,322,485, and these valves use thermotropic compounds which are high melting, often above 150°C. Such light valves and displays are generally controlled by an electric field and operate when liquid crystal material is in its mesomorphic state.

Generally, at high temperature and with no electric field applied to the nematic liquid crystal material, the device containing a thin layer of this material is relatively transparent to light. When an electric field is applied to the liquid crystal material above a threshold voltage value, which depends upon the particular liquid crystal composition, the device appears to become cloudy in the region of the field. This effect is due to the scattering of light by disruption of the liquid crystal molecules which align themselves when the electric field is applied.

This electro-optical effect due to alignment of the nematic liquid crystal molecules in the electric field may generally be employed in a transmissive, reflective, or absorptive type flat panel display, or in light shutters, and based thereon, there are still other applications which are obvious.

These prior art liquid crystals of the type available in the afore-mentioned patent, even when super-cooled, have relatively high nematic transition temperatures, i.e., the temperatures at which the material enters its nematic mesomorphic state. Since the nematic liquid crystal composition must be operated while in its nematic mesomorphic state, it has long been desirable to use compositions which have a low crystalnematic transition temperature, if possible below 100°C., and which are colorless and stable to water, oxygen and ultraviolet light. It is this objective which the present invention admirably fulfills. In the past, the liquid crystal display devices have had to be heated in order to achieve the mesomorphic temperature range and the trans-stilbene compounds herein disclosed have obviated this heating requirement by their unique operating temperatures at or near room temperature, in use alone or in admixtures which broaden the nematic range.

The trans-stilbene compounds of the invention do not melt to normal liquids, but at a sharp transition temperature they produce a turbid nematic melt. With some of the compounds, the nematic state is achieved below the melting point, a condition achieved by supercooling the liquid. These are termed abnormal liquid crystals. With others, the nematic state is achieved above the melting point and these are termed normals. With these latter types, on the further heating of the melt to a higher temperature, the turbid melt abruptly changes to a clear isotropic liquid, characteristically like any normal liquid and distinct from the nematic liquid which is anisotropic with respect to the light passing through it.

The term "nematic" means "threadlike," which refers to the fact that when one examines the nematic substance under a microscope, one sees tiny threadlike structures representing the boundaries between regions of different molecular orientation. When a nematogenic crystalline solid is heated, the crystals collapse sharply at the melting point, but in this case form a flowing turbid liquid uniformly throughout its volume. At a higher temperature, the turbidity of this nematic mesophase suddenly disappears, and the liquid becomes an ordinary isotropic liquid.

Nematogenic materials are composed of elongated, rodlike molecules. It is believed that in the nematic mesophase, the molecules of the melt are ordered so that the long axes of the molecules are parallel, but the centers of gravity of the molecules are not in any definite or regular spatial arrangement. Furthermore, each molecule is free to rotate around its long axis.

PRIOR COMPOUNDS USED AS NEMATIC CRYSTALS

Relatively few materials are available for liquid crystal imaging devices which are nematic at or near room temperature, and the only materials known prior to this invention which meet this requirement are the Schiff bases and mixtures thereof. Members of this Schiff base class suffer from an inherent yellow color, lack of long term stability, and decomposition in the presence of moisture over a period of time and in the presence of ultraviolet light. When the decomposition has proceeded to a large enough extent, these materials will no longer exhibit their nematic properties as desired.

The trans-stilbene compounds of the present invention completely overcome these aforesaid disadvantages, i.e., they are white, not moisture-sensitive, are not affected to any great extent in the presence of long wavelength ultraviolet light, and the new compounds of this invention exhibit the nematic mesophase at or near room temperature.

PRIOR TRANS-STILBENE COMPOUNDS

Stilbene derivatives as in U. S. Pat. No. 3,322,485 have been reported to be nematic liquid crystals, but these materials have high melting temperatures. Pure trans-4, 4'-dimethoxy-stilbene has a melting point of 215°–216°C. (see JACS, Vol. 54, page 3628, 1932) and must be super-cooled, with great difficulty, to 176°C. before a fleeting nematic phase can be detected. No useful device could be made with this substance.

It is surprising to find that the trans-stilbene compounds of the invention have significantly lower melting points while still maintaining nematic order in the melt. This is achieved by substituting the stilbenes, at strategic locations R, $R_1$, $R_2$, $R_3$ and $R_4$ in Formula I, with substituents large enough to force the benzene rings out of coplanarity, but small enough to insure that the overall length and breadth ratio would not be decreased appreciably.

Ordinarily, the attractive forces which are responsible for molecular mesomorphic alignment also tend to stabilize the crystal form of a substance. This can be readily visualized by comparing melting points and nematic clearing points for a number of mesomorphic materials and noting their general tendency to increase or decrease together. Therefore, to achieve a room temperature nematic substance, structural modifications should be of the type which lowers the crystalline melting point to a greater extent than the mesomorphic clearing point.

Due to the nature of liquid crystal phenomena, and the close relationship to molecular structure, there is no simple affinity which exists between symmetry of the molecule and nematic clear points. It is well-known that molecules which possess a high degree of symmetry will pack well in the solid phase and, hence, exhibit a relatively high melting point.

Thus, on the basis of the known properties of dimethoxy stilbene, it is surprising to find that the unsymmetrical derivatives of trans-stilbene of Formula I with significantly lowered melting points still maintain nematic properties in the melt and provide nematic ranges which are also lowered significantly, and down to room temperature.

The introduction of asymmetry into the trans-stilbene molecule is achieved by (a) the use of unsymmetrical substituents in the para positions and/or (b) the replacement of one of the $\alpha$, $\beta$ or ortho hydrogen atoms by small but bulkier groups such as methyl, ethyl, trifluoromethyl, cyano, chlorine, fluorine or bromine, to thereby disrupt the coplanarity of the benzene rings and the ethylene linkage and, as a result, to markedly affect the melting points.

To insure an appreciable melting point depression, at least one of the three groups $R_2$, $R_3$ and $R_4$ of Formula I should be different from H. The end groups R and $R_1$ could be any suitable substituent which is known to foster mesomorphism, such as ester, nitrile, alkyl, and alkoxy chains.

The following table summarizes the characteristics of preferred trans-stilbene compounds of the invention, wherein R and $R_1$ represent the substituents in the 4 and 4' phenyl positions, respectively, of the trans-stilbene under general Formula I hereinabove, $R_3$ and $R_4$ represent the radicals in the $\beta$ and $\alpha$ positions, respectively, and $R_2$ represents the substituent in the R phenyl ring which is ortho to the $\alpha$-carbon of the stilbene molecule.

TABLE I

| Lab. Compound No. | R | $R_1$ | $R_2$ | $R_3$ | $R_4$ | M (°C) | N-I* (°C) |
|---|---|---|---|---|---|---|---|
| 10 | $CH_3O$ | n-$C_6H_{17}O$ | H | $CH_3$ | H | 102 | 80 |
| 8 | n-$C_4H_9O$ | n-$C_4H_9O$ | H | H | $CH_3$ | 98 | 97 |
| 11 | $CH_3O$ | n-$C_6H_{17}O$ | H | Cl | H | 85 | 87 |
| 15 | $C_2H_5O$ | n-$C_4H_9$ | H | $CH_3$ | H | 64 | 59 |
| 17 | $C_2H_5O$ | n-$C_4H_9$ | H | H | $CH_3$ | 60 | 60 |
| 20 | $C_2H_5O$ | n-$C_5H_{11}$ | H | Cl | H | 52 | 69 |
| 18 | $C_2H_5O$ | n-$C_4H_9$ | H | H | Cl | 36 | 56 |
| 19 | $C_2H_5O$ | n-$C_4H_9$ | $CH_3$ | H | H | 49 | 44 |
| 33 | $\overset{\overset{O}{\|\|}}{CH_3C\text{-}O\text{-}}$ | n-$C_4H_9$ | H | Cl | H | 48 | 45 |
| 13 | $CH_3O$ | n-$C_6H_{17}$ | H | Cl | H | 42–43 | 47 |
| 31 | n-$C_7H_{15}O$ | n-$C_3H_7$ | H | Cl | H | 42 | 58 |
| 12 | $CH_3O$ | n-$C_4H_9$ | H | Cl | H | 40 | 38 |
| 23 | $C_2H_5O$ | (3-methyl)-butyl | H | Cl | H | 40 | 35 |
| 16 | $C_2H_5O$ | n-$C_4H_9$ | H | Cl | H | 29 | 58 |
| 28 | n-$C_3H_7O$ | n-$C_4H_9$ | H | Cl | H | 35 | 37 |
| 21 | $C_2H_5O$ | n-$C_6H_{13}$ | H | Cl | H | 34 | 59 |
| 30 | n-$C_6H_{13}O$ | n-$C_4H_9$ | H | Cl | H | 33 | 53 |
| 22 | $C_2H_5O$ | n-$C_8H_{17}$ | H | Cl | H | 32 | 61 |
| 26 | $C_2H_5O$ | 2-methyl-pentyl | H | Cl | H | 32 | 61 |

| | | | | | | | |
|---|---|---|---|---|---|---|---|
| 29 | n-C$_4$H$_9$O | n-C$_4$H$_9$ | H | Cl | H | 30 | 52 |
| 27 | C$_2$H$_5$O | 2-methyl-hexyl | H | Cl | H | 22 | 35 |
| 24 | C$_2$H$_5$O | 2-methyl-butyl | H | Cl | H | 29–32 | 34 |
| 32 | n-C$_4$H$_9$ | n-C$_8$H$_{17}$ | H | Cl | H | 14 | 10 down to −5°C** |
| 34 | N≡C | n-C$_4$H$_9$ | H | Cl | H | 47 | 41 |

\* Nematic-Isotropic Transition Temperature, the temperature at which the nematic-isotropic transition occurs. If N-I is the same as MP (Lab. Compound No. 17) or less than MP (Lab. Compound No. 10), the liquid is super-cooled to reach transition. If N-I is greater than MP (Lab. Compound No. 11), the liquid may be heated or cooled to reach transition.
\*\* Smectic to nematic transition.

Dictionary of Compounds of Table I

To facilitate identification, the names of the above compounds are given below:

| Group No. | Lab. Compound No. | Name |
|---|---|---|
| (9) | 10 | 4-methoxy, 4'-n-octyloxy-β-methyl-trans-stilbene |
| (10) | 8 | 4-n-butoxy, 4'-n-butoxy-α-methyl trans-stilbene |
| (8) | 11 | 4-methoxy, 4'-n-octyloxy-β-chloro trans-stilbene |
| (4) | 15 | 4-ethoxy, 4'-n-butyl-β-methyl trans-stilbene |
| (3) | 17 | 4-ethoxy, 4'-n-butyl-α-methyl trans-stilbene |
| (2) | 20 | 4-ethoxy, 4'-n-pentyl-β-chloro trans-stilbene |
| (1) | 18 | 4-ethoxy, 4'-n-butyl-α-chloro trans-stilbene |
| (6) | 19 | 4-ethoxy, 2-methyl; 4'-n-butyl trans-stilbene |
| (7) | 33 | 4-acetoxy, 4'-n-butyl-β-chloro trans-stilbene |
| (2) | 13 | 4-methoxy, 4'-n-octyl-β-chloro trans-stilbene |
| (2) | 31 | 4-n-heptyloxy, 4'-n-propyl-β-chloro trans-stilbene |
| (2) | 12 | 4-methoxy, 4'-n-butyl-β-chloro trans-stilbene |
| (2) | 23 | 4-ethoxy, 4'(3-methylbutyl)-β-chloro trans-stilbene |
| (2) | 16 | 4-ethoxy, 4'-n-butyl-β-chloro trans-stilbene |
| (2) | 28 | 4-n-propoxy, 4'-n-butyl-β-chloro trans-stilbene |
| (2) | 21 | 4ethoxy, 4'-n-hexyl-β-chloro trans-stilbene |
| (2) | 30 | 4-n-hexyloxy, 4'-n-butyl-β-chloro trans-stilbene |
| (2) | 22 | 4-ethoxy, 4'-n-octyl-β-chloro trans-stilbene |
| (2) | 26 | 4-ethoxy, 4-(2-methylpentyl)-β-chloro trans-stilbene |
| (2) | 29 | 4-n-butoxy, 4'-n-butyl-β-chloro trans-stilbene |
| (2) | 27 | 4-ethoxy, 4'-(2-methylhexyl)-β-chloro trans-stilbene |
| (2) | 24 | 4-ethoxy, 4'-(2-methylbutyl)-β-chloro trans-stilbene |
| (5) | 32 | 4-butyl, 4'-n-octyl-β-chloro trans-stilbene |
| (11) | 34 | 4-cyano, 4'-n-butyl-β-chloro trans-stilbene |

It is unexpected to find that the substituted trans-stilbenes exhibit a nematic mesophase since unsubstituted trans-stilbenes do not regularly exhibit a mesophase and since such known rod-shaped molecules, such as 4-4' dimethoxy trans-azobenzene, melting point 165°C., has a nematic transition to isotropic liquid at 110°C. requiring a very large super-cooling range which runs the risk of solidification and which still requires temperatures above 100°C. This azobenzene isomerizes under ultraviolet light and is sensitive to oxygen.

If 4, 4'-dimethoxy trans-azoxy benzene, melting point 116°C., is employed, its nematic-isotropic transition of 134°C. is much higher than its melting point, but the easier requirement for heating control is more than offset by its yellow color and the instability towards ultraviolet light. Also, Schiff bases have the same drawbacks and are sensitive to water. Accordingly, only the present class, exemplified in Table I, overcomes the deficiencies of prior art materials of stability to water, oxygen and ultraviolet radiation, and is white in appearance.

All of the compounds of Table I are stable, ultraviolet resistant, moisture resistant, oxygen resistant, white crystalline solids which exhibit unusually low melting points and nematic-isotropic transition temperatures which render them obviously useful for room temperature and commercial applications where the ordinary organic nematic thermotropic compound would be wholly impractical.

For example, a dimethoxy trans-stilbene having a melting point of 216°C. must be very carefully super-cooled to 176°C. before the nematic transition (monotropic) occurs, and the achievement of this super-cooled condition is very precarious since solidification will spontaneously take place. The diethoxy trans-stilbene compound has a melting point of 209°C. and a nematic transition temperature in super-cooled liquid state at 189°C.

Only by substituting a bulky group at α or β carbon atoms or in the ortho position of a phenyl ring of the stilbene is the melting point substantially reduced to near or below 100°C. For example, 4,4'-diethoxy, α-methyl trans-stilbene (which differs from the last compound mentioned in the preceding paragraph by the α-methyl group) has a melting point of 106°C. and a nematic-isotropic transition temperature of 122°C., rendering the compound useful between 106° and 122°C. If this compound is employed in a 50 mole-% binary mixture with Lab. Compound No. 8, the useful nematic range is broadened from about 85° to about 110°C., which includes the temperature of boiling water.

All of the "normal" compounds listed in Table I (those substances for which the melting point is below the nematic-isotropic transition temperature) have a useful nematic range which, at least, encompasses the temperature range between the two transitions. Thus, Lab. Compound No. 22 can be employed in light valve devices at any temperature between 32° and 61°C. This broad range makes the compound very easy to use. Lab. Compound No. 26, which has a nominal wider nematic range between 32° and 41°C., in actuality has a wider useful range since the super-cooled nematic liquid does not tend to crystallize above 15°C. Hence its practical nematic range is 15°–41°C., which includes room temperature.

Other normal compounds in Table I have useful nematic ranges which cover a large part of the temperature range between room temperature and the boiling point of water. Thus, Lab. Compound No. 20, which melts to a nematic liquid at 52°C., can be heated to 69°C. before the nematic-isotropic transition occurs. Lab. Compound No. 11 has a nematic range between 85° and 87°C. Compounds 24, 27, 28 and 13, among others, have a nematic phase approximately 10°–25°C.

above room temperature, so that the compounds can serve as temperature indicators of body temperature or of conditions for growth in the laboratory of various living organisms, or of conditions for fermentation.

The abnormal substances in Table I (those in which the nematic-isotropic transition temperature is at or below the melting point) can be used alone as a nematic material in a device only if the super-cooled nematic liquid has a very small tendency to crystallize at the operating temperature. For example, Lab. Compound No. 12, which melts at 40°C. to a liquid and which turns nematic from the liquid at 38°C., has an operable nematic temperature range of 36°–38°C., which includes body temperature. Within this operable range, the substance will remain nematic and therefore a device can be fabricated which has an indefinite lifetime at this temperature. If this same device were operated at 30°C., for example, the lifetime of the super-cooled nematic phase would be appreciably shortened, on the order of minutes.

For the most part, however, the abnormal substances must be used in mixtures (with either normal or abnormal compounds) in order to insure that the nematic state will be thermodynamically stable.

Mixtures generally behave such that the melting points are usually lower than that of any components while the nematic-isotropic transition temperature is the weighted average of the individual N-I transition temperatures. Thus, a 50 mole-% binary mixture of Lab. Compounds Nos. 12 and 33 melts to a nematic mesophase at 30°C. which persists until 42°C., where the mixture turns into a regular liquid. A mixture containing the 60 mole-% of Lab. Compound No. 16 and 40 mole-% of Lab. Compound No. 22 has a stable nematic mesomorphic range between 8° and 59°C. This broadening of the nematic range, which extends the usefulness of the materials as essential components of display devices, is typical of many other examples which have been studied.

SYNTHESIS OF THE STILBENES: PRECURSOR COMPOUNDS

In general, for the preparation of all of the desired stilbenes listed in Table I, it is preferred to use a benzyl phenyl ketone precursor. This precursor is prepared by Friedel-Crafts acylation of a substituted benzene, e.g., alkoxybenzene or alkylbenzene, with a suitable phenylacetyl chloride derivative, e.g., 4-alkoxyphenylacetyl chloride, 4-alkylphenylacetyl chloride, or 4-acetoxyphenylacetyl chloride. The acetyl chlorides are synthesized from the corresponding acetic acids by reaction with thionyl chloride.

The Friedel-Crafts acylation reaction is carried out in carbon disulfide or nitromethane containing aluminum chloride catalyst. The reaction is worked up with hydrochloric acid and ether in order to recover the desired benzyl phenyl ketone. All of the ketone precursors have been prepared in this manner, and all have been characterized to prove their identities.

These ketones, when reacted with phosphorous pentachloride, provide the $\alpha$ and $\beta$-chloro trans-stilbene derivatives (Groups 1, 2, 5, 7, 8 and 11).

If these ketones are instead reduced directly with lithium aluminum hydride and the resulting benzyl alcohol derivatives are dehydrated, stilbene derivatives containing no $\alpha$ or $\beta$ substituents are recovered. An example of a substance prepared by this modification is Lab. Compound No. 19 in Table I, 4-ethoxy, 2-methyl, 4'-n-butyl trans-stilbene. This method, in general, is employed for all substances belonging to Group 6.

Alternatively, if the benzyl phenyl ketone which is prepared by the Friedel-Crafts acylation mentioned above is reacted with methylmagnesium halide and the intermediate alcohol subsequently dehydrated, the trans-stilbene which is recovered will belong to Group 3, 4, 9 or 10, i.e., it will contain an $\alpha$ or $\beta$ methyl group. An example of this is the preparation of Lab. Compound No. 17, 4-ethoxy, 4'-n-butyl-$\alpha$-methyl trans-stilbene.

GENERAL METHOD FOR MAKING $\alpha$ OR $\beta$ CHLORO TRANS-STILBENES

A preferred general method for the synthesis of $\alpha$- or $\beta$-chloro trans-stilbenes and for Lab. Compound No. 18 of Table I, i.e., 4-ethoxy, 4'-n-butyl-$\alpha$-chloro trans-stilbene of melting point 36°C. and nematic range 36°–56°C., is as follows:

To 2 grams phosphorous pentachloride (0.015 mole) in 30 ml. of methylene chloride, there are added 2.1 grams of 4-n-butylbenzyl, 4'-ethoxyphenyl ketone (0.01 mole) in 30 ml. of methylene chloride; the mixture is stirred and refluxed for 4–5 hours until the reaction is complete, and then cooled. The mixture turns from yellow to red. Additional methylene chloride is added; the organic phase is washed with saturated sodium bicarbonate solution and is then dried over anhydrous sodium sulfate, after which the solvent is evaporated at a water pump and the oil is eluted with benzene through a silica gel column (25 grams of silica gel per gram of oil). Benzene is evaporated and the oil residue is recrystallized from petroleum ether or alcohol at −78°C. to recover the trans form of the product in 40 percent yield.

Yields for this reaction generally vary from 10 to 40 percent, depending upon the ketone employed and losses encountered in recrystallization. This method was used to make other $\alpha$- and $\beta$-chloro trans-stilbenes of Groups 1, 2, 5, 7, 8 and 11.

GENERAL METHOD FOR SYNTHESIS OF $\alpha$ OR $\beta$-METHYL TRANS-STILBENES

An ethereal solution of methylmagnesium iodide was prepared from 0.02 mole of magnesium and 0.025 mole of methyl iodide in 60 ml. of dry ether. To this was added dropwise 0.006 mole of an appropriate benzyl phenyl ketone in 40 ml. of ether. After a reflux period of 2 hours, the reaction mixture was hydrolyzed with water and dilute sulfuric acid and additional ether was added. The organic layer was separated and washed with water, saturated sodium bicarbonate, and saturated sodium chloride solutions. The ether layer was dried over sodium sulfate, and the ether was removed at the water pump. The oily or semisolid residue, which contained the intermediate benzyl alcohol product, was directly dehydrated as follows:

In an open sublimator (without cold finger), the residue was mixed with 0.03 mole of sodium bisulfate. The mixture was heated to 175°–200°C. 20 minutes to allow dehydration to occur, as evidenced by the evolution of vaporous material. The cold finger was then placed atop the sublimator in the usual manner, and the crude stilbene was allowed to sublime under high vacuum. The product was recrystallized from petroleum ether at −78°C. (charcoal treatment) to constant melting point.

The yields ranged from 10 to 25 percent, depending upon the ketone used and losses in recrystallization.

Typically, a Grignard reagent formed from 0.5 grams of magnesium and 3.5 grams of methyl iodide was allowed to react with 1.8 grams of p-ethoxy-benzyl p-n-butylphenyl ketone. After the workup, the residue was dehydrated with 4 grams of sodium bisulfate. Following recrystallization, 0.25 grams (14 percent of the white methylstilbene (Lab. Compound No. 15 in Table I), melting point 64°C., was recovered. The same procedure was employed in the preparation of the other compounds of Groups 3, 4, 9 and 10.

TRANS-STILBENES WITH NO α OR β SUBSTITUENTS (GENERAL PROCEDURE)

The following procedure was used to prepare trans-stilbenes containing substituents only on the two benzene rings.

An ethereal solution of 0.005 mole of the appropriate benzyl phenyl ketone was added to a large excess (about 0.05 mole) of lithium aluminum hydride in a flask equipped with a nitrogen purge, reflux condenser, and mechanical stirrer. Stirring was continued for 2 hours at room temperature and 30 minutes at reflux. The reaction mixture was decomposed with ethyl acetate, methanol, water, and finally dilute sulfuric acid. The ether layer was separated and washed with water, saturated sodium carbonate solution, and saturated sodium chloride solution. After drying (sodium sulfate), the ether was removed on the rotary evaporator, and the residual oily product, containing the desired benzyl alcohol, was dehydrated directly in a sublimator with sodium bisulfate, as described in the preparation of the methyl trans-stilbenes. The product was recrystallized repeatedly from petroleum ether (−78°C.) to afford the white product in 10–15 percent yield. Lab. Compound No. 19 was prepared in this way.

PURITY AND STRUCTURE DETERMINATION OF THE STILBENES

All of the stilbenes which are listed in Table I have been shown to be single, pure substances to the extent of at least 99 percent. The criteria employed in these determinations include gas chromatography, thin layer chromatography, and melting point characteristics.

All of the stilbenes which have been recovered by the various synthetic methods of the invention have been characterized by IR, UV and NMR spectra, by elemental analyses, and, in some cases, by mixed melting point determinations of the same compound prepared by different methods.

Often, the spectral analyses appear to be completely determinative of the structure. For example, the NMR spectra for Lab. Compounds Nos. 10 and 8 respectively showed the proper number of hydrogens of a given chemical type and with consistent splitting patterns in the expected spectral regions. It is significant, however, that the aromatic and vinylic hydrogen resonances, in the region from 6 to 8 PPM downfield from the tetramethylsilane standard, appeared to be identical for the two substances. Since these two materials are homologs, this result is the required one if the postulated structures are correct.

A similar relationship in the NMR spectra for all compounds belonging to Group 2 was noted; that is, all Group 2 substances exhibited identical NMR resonances in the aromatic/vinylic region of the spectra.

The nematic properties of the stilbenes listed in Table I are significant with regard to the question of cis versus trans conformations in these compounds. It is well-known that mesomorphism in organic materials requires that the individual molecules be rod-shaped, in general. This eliminates the cis conformation from consideration, since bustances of this type are not rod-shaped, nor are any liquid crystals known which display this cis conformation about the central linkage group. Hence the stilbenes in Table I must possess the trans geometry.

MIXTURES

When 60 mole-% of Lab. Compound No. 16 of Table I is blended with 40 mole-% of Lab. Compound No. 22, the melting range of the mixture varies from −6°C. to +8°C., and the nematic range of the mixtures varies from 8°–59°C. The mixture provides a remarkably long nematic range which cannot be achieved by the components separately and which adapts the thermotropic mixture to be used in a wide variety of applications in display and temperature sensing.

Among the other mixtures which have been studied and found to exhibit useful nematic ranges are:
a. 50 mole-% Lab. Compound NO. 16 plus 50 mole-% Lab. Compound No. 32; useful nematic range of −4° − +23°C.
b. 50 mole-% Lab. Compound No. 12 plus 50 mole-% Lab. Compound No. 33; useful nematic range of 30°–42°C.
c. 50 mole-% Lab. Compojnd No. 8 plus 50 mole-% Lab. Compound No. 11; useful nematic range of 75°–92°C.
d. 50 mole-% Lab. Compound No. 8 plus 50 mole-% 4,4'-diethoxy-α-methyl trans-stilbenes; useful nematic range of 85°–110°C.
e. 50 mole-% Lab. Compound No. 33 plus 50 mole-% Lab. Compound No. 34; useful nematic range of 29°–39°C.

ELECTRO-OPTICAL DISPLAY UTILITY

The utility of the novel stable trans-stilbene compounds displaying nematic mesophases at or near room temperature is for the purposes set out in U. S. Pat. No. 3,322,485 with the present advantage of the instant compounds over the compounds of said patent, in that the electro-optical display function and light-valve response can be carried out at or near room temperature and under conditions where the compounds of the prior patent would be unstable and deteriorate and, hence, become inoperative.

One type of electro-optical element utilizing compounds of the present invention is that described in U. S. Pat. No. 3,322,485 and comprises transparent substrates positioned opposite each other with adjacent parallel faces and the nematic compound therebetween in a sufficiently thin, uniform layer (between 5 and 300 microns) so that the connection of an electrical lead on a conductive path on an inner face of each plate will provide a suitable voltage bias to provide a sudden change of optical properties of the organic nematic thermotropic compound between the plates. This change is based upon the disruptive effect of an electric current passing through a nematic film, the intensity of light scattered being greatly enhanced by this disruption. Voltage differences of the order of 1,000 volts per centimeter are useful to effect the desired optical modulation. Above the threshold voltage, a turbulent flow of the liquid and a concomitant disorientation of the medium results in a state that scatters the light strongly. The large intensity of the scattering is due to the high birefringence of the liquid. In contrast to the compound (9) at column 3 of U. S. Pat. No. 3,322,485, all of the compounds of the present invention are operative at temperatures from 100°C. to 200°C. below the operative temperature of compound (9), and this advantage is of enormous practical benefit for more electro-optical uses.

It should be noted that in a few cases in which a nematic-stilbene electro-optical display device containing a compound or mixture from Table I was made, the stilbenes were of such high purity (greater than 99.9 percent) that insufficient charge carriers were present in the nematic film to enable the resulting light scattering to continue indefinitely. This situation can be overcome, however, by the addition of about 0.01 percent of an ionic substance, such as tremethylhexadecylammonium bromide or dodecylpyridinium p-toluenesulfonate to the nematic liquid.

What is claimed is:

1. In an electro-optical display device, an organic nematic thermotropic composition between electrodes having the general formula

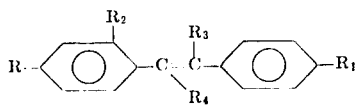

wherein R and $R_1$ are radicals which foster mesomorphism and each is selected from the group consisting of alkyl, alkanoyloxy, cyano, and alkoxy radicals, and wherein $R_2$, $R_3$ and $R_4$ are $-CH_3$, $-Cl$ or $-H$ and at least one of these groups $R_2$, $R_3$ and $R_4$ being different from H, and mixtures of said compounds.

2. In an electro-optical display device as claimed in claim 1, wherein said composition is the compound 4-n-butoxy, 4'-n-butyl-β-chloro trans-stilbene having a nematic range of 30°–52°C.

3. In an electro-optical display device as claimed in claim 1, wherein said composition is the compound 4-ethoxy, 4'-n-butyl-β-chloro trans-stilbene having a nematic range of 29°–58°C.

4. In an electro-optical display device as claimed in claim 1, wherein said composition is the compound 4-ethoxy, 4'-(2 methylpentyl)-β-chloro trans-stilbene having a nematic range of 32°–41°C.

5. In an electro-optical display device as claimed in claim 1, wherein said composition is the compound 4-ethoxy, 4'-n-pentyl-β-chloro trans-stilbene, having a nematic range of 52°–69°C.

6. In an electro-optical display device as claimed in claim 1, wherein said composition is the compound 4-ethoxy, 4'-n-butyl-α-chloro trans-stilbene, having a nematic range of 36°–56°C.

7. In an electro-optical display device as claimed in claim 1, wherein said composition is the compound 4-n-hexyloxy, 4'-n-butyl-β-chloro trans-stilbene having a nematic range of 33°–53°C.

8. In an electro-optical display device as claimed in claim 1, wherein said composition is the compound 4-ethoxy, 4'-(2-methylhexyl)-β-chloro trans-stilbene having a nematic range of 22°–35°C.

9. In an electro-optical display device as claimed in claim 1, wherein said composition is the compound 4-n-heptyloxy, 4'-n-propyl-β-chloro trans-stilbene, having a nematic range of 42°–58°C.

10. In an electro-optical display device as claimed in claim 1, wherein said composition is the compound 4-ethoxy, 4'-hexyl-β-chloro trans-stilbene, having a nematic range of 34°–59°C.

11. In an electro-optical display device as claimed in claim 1, wherein said composition is the compound 4-ethoxy, 4'-n-octyl-β-chloro trans-stilbene, having a nematic range of 32°–61°C.

12. In an electro-optical display device as claimed in claim 1, wherein said composition is the compound 4-ethoxy, 4'-(2-methylbutyl)-β-chloro trans-stilbene, having a nematic range of 29°–34°C.

13. In an electro-optical display device as claimed in claim 1, wherein said composition is a mixture containing 60 mole-% of 4-ethoxy, 4'-butyl-β-chloro trans-stilbene and 40 mole-% of 4-ethoxy, 4'-n-octyl-β-chloro trans-stilbene, said mixture having a nematic range of from 8°–59°C.

14. In an electro-optical display device as claimed in claim 1, wherein said composition is a mixture containing 50 mole-% of 4-n-butyoxy, 4'-n-butoxy-α-methyl trans-stilbene and 50 mole-% of 4-methoxy, 4'-n-octyoxy-β-chloro trans-stilbene, said mixture having a nematic range of from 75°–92°C.

15. In an electro-optical display device as claimed in claim 1, wherein said composition is a mixture containing 50 mole-% of 4-n-butoxy, 4'-n-butoxy-α-methyl trans-stilbene and 50 mole-% of 4,4'-diethoxy-α-methyl trans-stilbene, said mixture having a nematic range of from 85°–110°C.

16. In an electro-optical display device as claimed in claim 1, wherein said composition is a mixture containing 50 mole-% of 4-acetoxy, 4'-n-butyl-β-chloro trans-stilbene and 50 mole-% of 4-cyano, 4'-n-butyl-β-chloro trans-stilbene, a mixture having a nematic range of from 29°–39°C.

* * * * *